Figure 1:
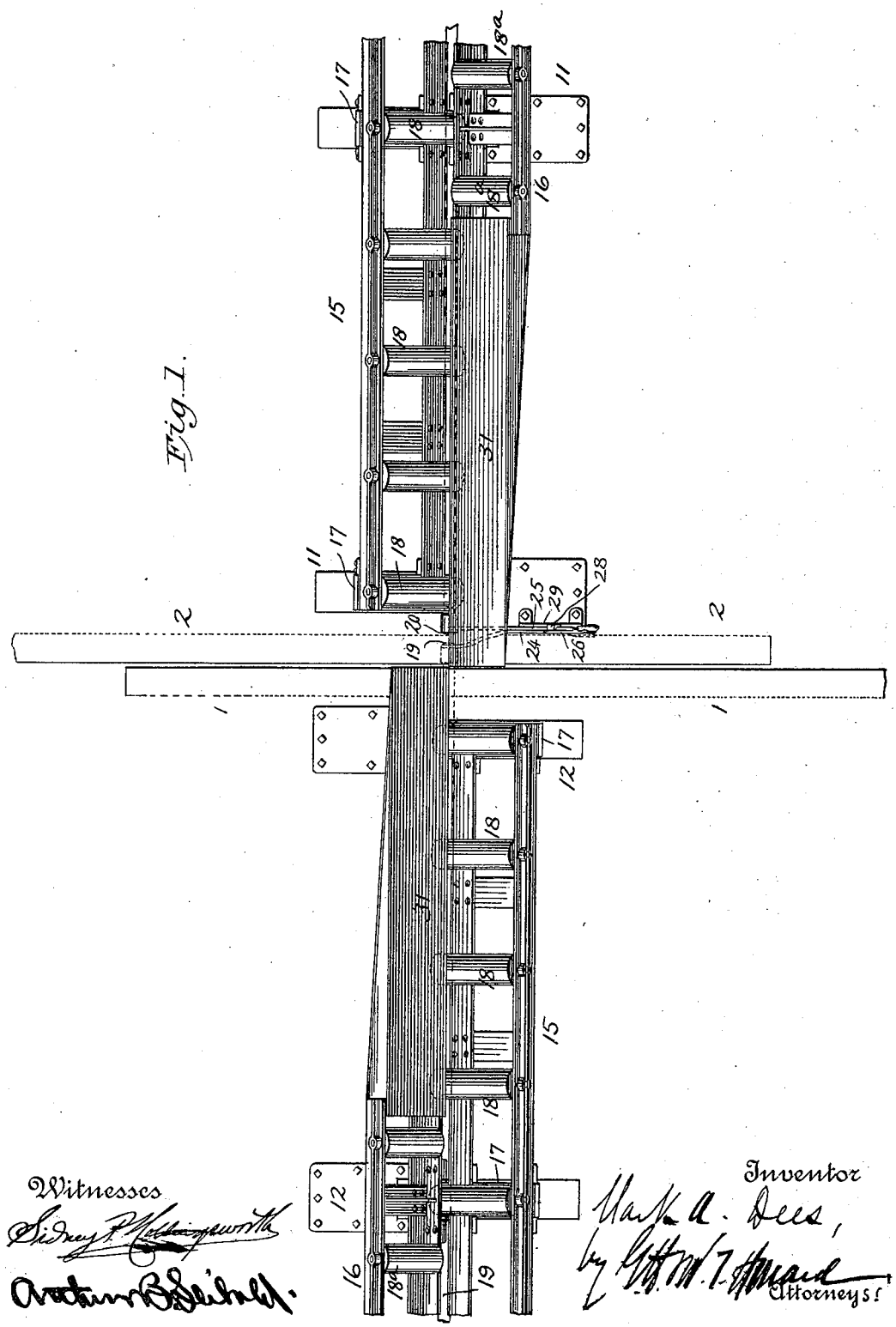

No. 684,919. Patented Oct. 22, 1901.
M. A. DEES.
SAWING MACHINE.
(Application filed Jan. 4, 1898.)

(No Model.) 3 Sheets—Sheet 1.

No. 684,919. Patented Oct. 22, 1901.
M. A. DEES.
SAWING MACHINE.
(Application filed Jan. 4, 1898.)
(No Model.) 3 Sheets—Sheet 2.

No. 684,919. Patented Oct. 22, 1901.
M. A. DEES.
SAWING MACHINE.
(Application filed Jan. 4, 1898.)
(No Model.) 3 Sheets—Sheet 3.

Witnesses Inventor
Mark A. Dees,
by Attorneys.

THE NORRIS PETERS CO., PHOTO-LITHO., WASHINGTON, D. C.

UNITED STATES PATENT OFFICE.

MARK A. DEES, OF MOSSPOINT, MISSISSIPPI, ASSIGNOR TO ANNIE STARKEY DEES, OF MOSSPOINT, MISSISSIPPI.

SAWING-MACHINE.

SPECIFICATION forming part of Letters Patent No. 684,919, dated October 22, 1901.

Application filed January 4, 1898. Serial No. 665,511. (No model.)

*To all whom it may concern:*

Be it known that I, MARK A. DEES, of Mosspoint, in the county of Jackson and State of Mississippi, have invented certain new and useful Improvements in Sawing-Machines, of which the following is a specification, reference being had to the accompanying drawings and to the numerals of reference marked thereon.

My invention relates to an improvement in machines for sawing logs after being quartered into what is known as "rift" or "quarter-sawed" lumber, or lumber in which the grain runs at an angle of forty-five degrees or more to the sides of the board when viewed from the end. This class of lumber is the most valuable obtainable from the log, and hence sawmill operators endeavor to produce as much of it as possible. By the ordinary method of first slabbing a log and then sawing it up a considerable loss is sustained. In the first place, a large proportion of the resulting product is of inferior grade, because in a number of the boards the angle of the grain to the side is less than forty-five degrees, and they therefore command less than that paid for rift lumber, and, again, when lumber is quartered and sawed by the usual method a loss is entailed when the boards are trimmed or edged, a portion of this loss coming from the best part of the board.

To obtain the greatest quantity of rift lumber and avoid the losses heretofore resulting from its production, as well as to cheapen the cost of manufacture, I have devised a machine wherein the entire log may be cut into rift lumber in a rapid and certain manner.

In carrying out my invention I arrange two band or other saws with their teeth facing in opposite directions, and which cross each other at a right angle between two supports on which the quarter-log is carried. These supports extend lengthwise in opposite directions from the cutting edges of the saws, their sides being at an angle of ninety degrees to each other and parallel with the saws, forming in appearance a trough-like receptacle within which the quarter-log is held. An overhead carriage driven by a cable or other well-known means is provided with depending arms to engage with the ends of the quarter-log and move it lengthwise against the saws, which alternately cut a board from a flat side of the quarter-log at each longitudinal movement.

Figure 2:
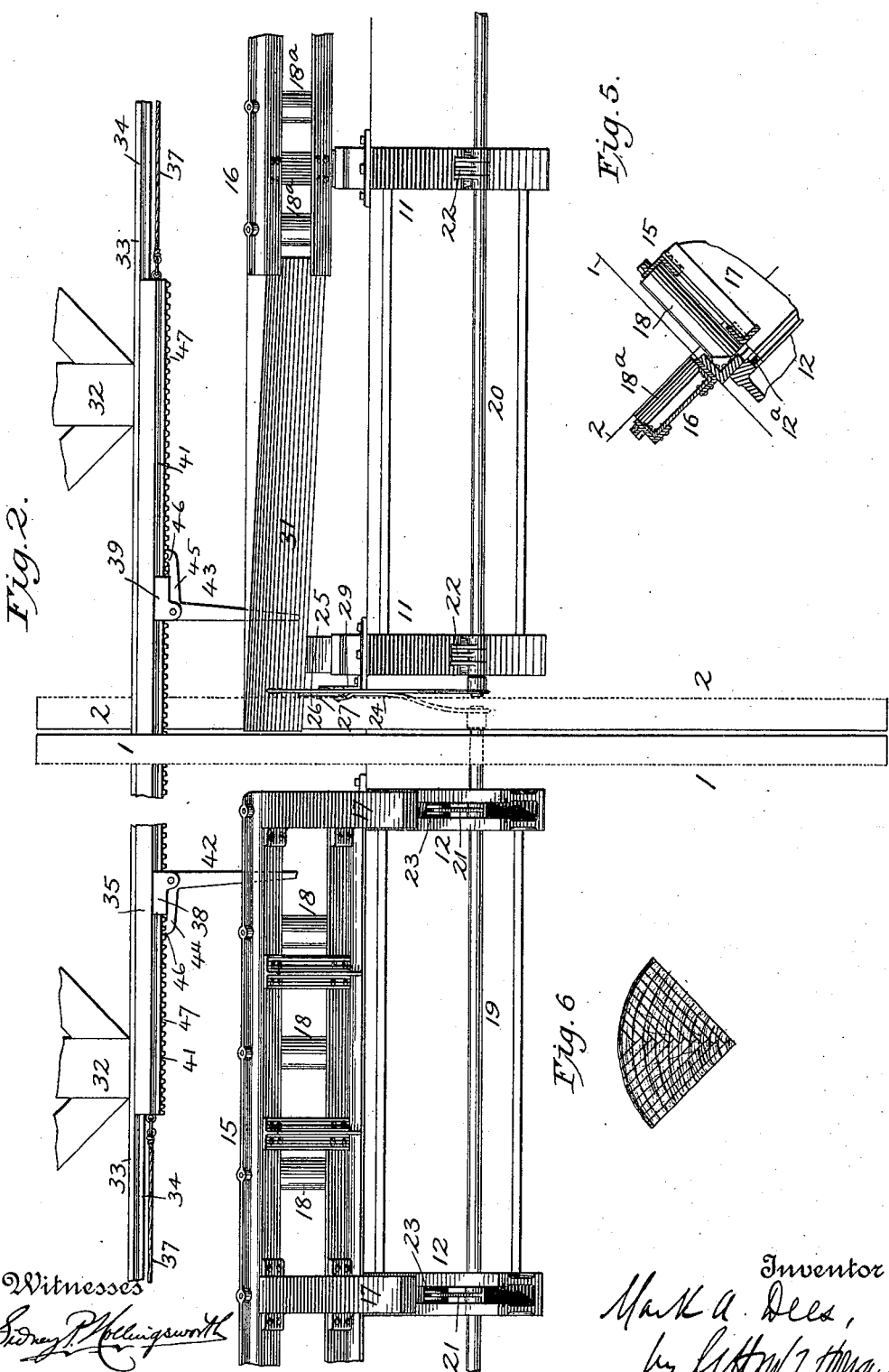
Figure 3:
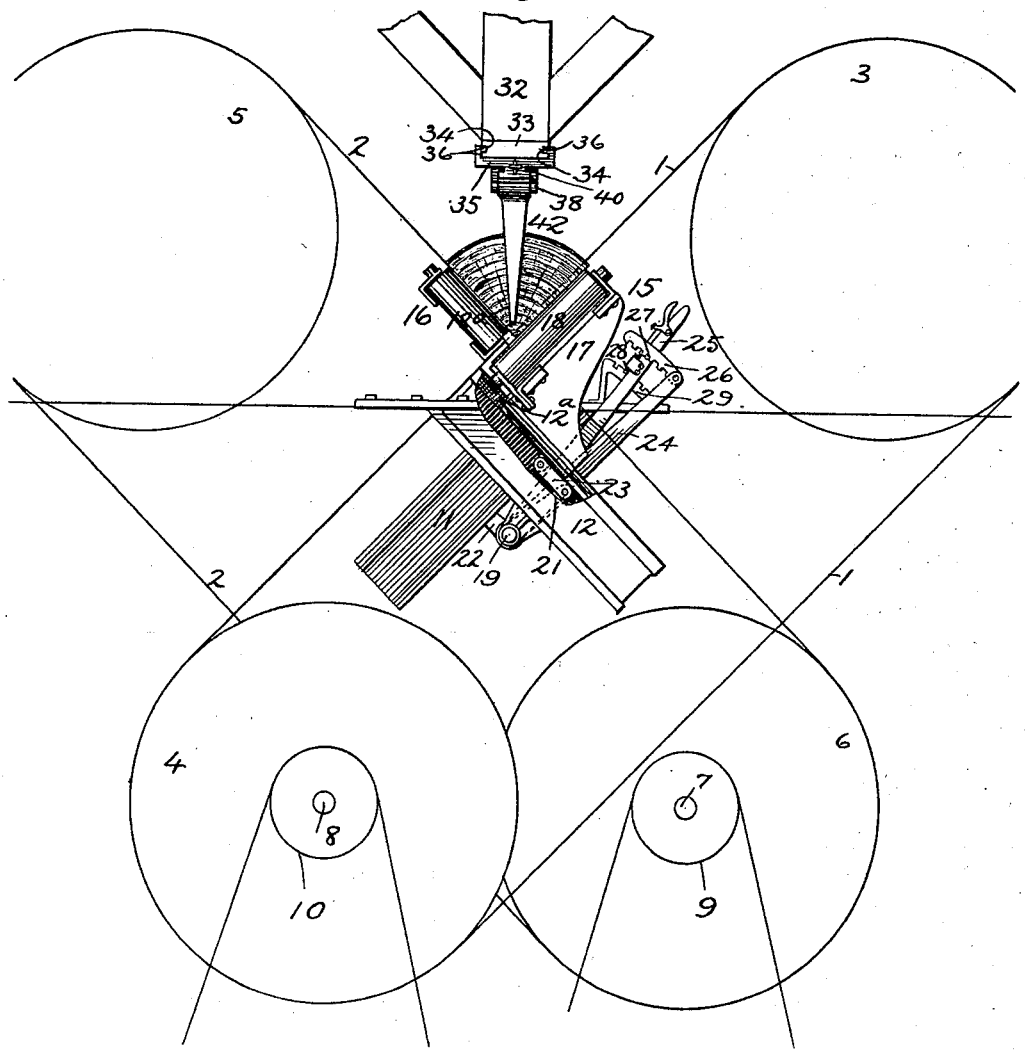
Figure 4:
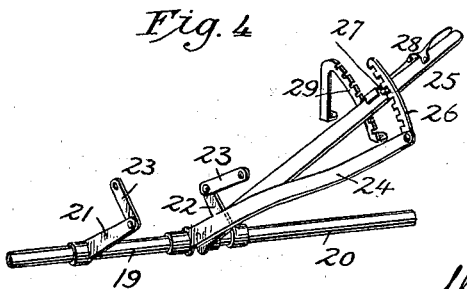

Referring to the drawings, Figure 1 is a plan view of my improved sawing-machine. Fig. 2 is a side elevation thereof. Fig. 3 is an end elevation. Figs. 4 and 5 show various details of construction. Fig. 6 shows a quarter of a log and the manner of its division into boards.

Similar numerals of reference indicate similar parts in the respective figures.

1 2 represent two saws, here shown as band-saws, mounted in suitable frames on pulleys 3, 4, 5, and 6, the upper pulleys 3 and 5 being made adjustable for the purpose of regulating the tension of the saws 1 2. These saws cross each other at an angle of ninety degrees and extend downwardly through the floor of the mill at an angle of forty-five degrees thereto, where the pulleys 4 6, mounted on shafts 7 8, are driven by belts passing over pulleys 9 10, fixed to the said shafts.

Extending upwardly through the floor of the sawmill are two bed-frames 11 12, the former lying parallel to and below the plane of the cutting edge of the saw 1, while the latter occupies a relative position with respect to the saw 2. These bed-frames 11 12 extend in opposite directions away from the cutting edges of the respective crossed saws 1 2 and on opposite sides of the angle formed thereby. On each bed-frame is mounted a sliding frame 15 and a fixed frame 16, they together forming a trough-shaped support for the quarter-log which rests therein, with its straight sides against the frames 15 16, as shown in Fig. 3. Each movable frame 15 extends upwardly at a right angle to the bed-frame and consists of brackets 17, which resemble in appearance the knees of a head-block and are firmly connected by cross-braces, thus forming a rigid support in which are journaled a series of rollers 18 for carrying a quarter-log and on which it can be easily moved in an endwise direction. Each frame 15 is arranged to slide on its bed-frame to and from the plane of the saw, the rollers 18 being at all times parallel thereto, Figs. 1 and 3.

The fixed frames 16 are secured to the bed-frames, as shown, each being substantially a continuation of the movable frame 15 on the opposite side of the saw, and, in connection with the movable frame on the same side of the saw, it forms the above-mentioned trough-shaped support in which the quarter-log rests. Rollers 18ª are journaled in the fixed frame 16 to sustain the quarter-log. It will be observed on reference to Fig. 3 that the upper surfaces of the inclined rollers 18ª in the fixed frame 16 lie in a plane common with that of the upper surface of the similarly-inclined saw. The distance therefrom of the movable frame can, however, be increased or diminished, as desired, and for this purpose I mount in suitable bearings below the bed-frames 11 12 two rock-shafts 19 20, in line with each other, the former being under the bed-frame 12, the latter under the bed-frame 11. On the rock-shaft 19 are secured arms 21, which extend upwardly toward one of the movable frames 15, to which they are connected by means of links 23. Similar arms 22 and links 23 connect the rock-shaft 20 to the other movable frame 15. To the inner ends of the rock-shafts 19 20, which are in close proximity, are secured two hand-levers 24 25, extending upwardly in position to be grasped by an operator for the purpose of moving the frames 15 on their respective bed-frames. The hand-levers 24 25 are adjustably connected together by means of a notched bar 26, pivoted to the upper end of the lever 24, engaging with a pin 27 on the hand-lever 25, which is extended beyond the pin to form a handle, as shown. As thus constructed the two rock-shafts 19 20 when connected together act as one shaft, so that when one movable frame 15 is depressed the other one will be elevated, and vice versa. The hand-lever 25 is retained in position by means of a latch 28, mounted thereon and adapted to engage with a curved rack 29, secured to the bed-frame 11. Stops 12ª on the bed-frame 11 12 prevent the frames 15, with their rollers 18, from passing beyond the planes of their respective saws, while their movement away from the saws is provided for by means of two hand-levers 24 25. When it is desired to change the thickness of the board to be cut from the quarter-log, it is only necessary to disengage the notched plate 26 from the pin 27, after which by increasing or decreasing the angle between the two levers 24 25 the distance between the face of the frame 15 and the saw will be increased or decreased in proportion to the change in the angle above spoken of. After a board has been cut from the quarter-log the latter will then be resting on the frame 15 which during the operation of sawing was elevated, and the corresponding fixed frame 16. If the latch 28 is now unlocked, the weight of the log will depress the frame 15 on which it partially rests, and elevate the previously-depressed frame 15 until further movement is prevented by the stops 12ª.

The inner end of each fixed frame 16—that is to say, the end nearest the saw—is brought to a sharp edge or made wedge-shaped, as at 31, and lies immediately behind its adjacent saw and in line therewith in such a position that it will enter the saw-kerf between the quarter-log and the board being cut therefrom and deflect the board away from the machine onto the floor or into a suitable carriage by which it is removed from the mill.

Attached to suitably-braced overhead supports 32 above the sawing-machine is a rail 33, extending the full length of the sawing-machine, its sides being grooved, as shown at 34. A carriage 35, provided with flanges 36, which fit in the grooves 34 of the rails 33, is arranged to be moved lengthwise thereon by means of a cable 37 or other driving mechanism. Blocks 38 39, having flanges 40, which fit in grooves 41 in the side of the carriage 35, pivotally support two depending arms 42 43, which project downwardly and engage the ends of the quarter-log for the purpose of presenting it endwise to each saw alternately as the carriage travels back and forth. Fingers 44 45 project laterally from the pivoted ends of the arms 42 43 and are provided with teeth or lugs 46, which engage with a rack 47 on the under side of the carriage 35. By swinging the arms inward or toward each other the teeth 46 are disengaged from the rack 47, thus permitting the arms to be moved to any position on the carriage desired to engage with the varied lengths of quarter-logs to be cut.

The operation of my invention is as follows: After a log has been quartered, which can be done on any sawmill, one of the quarters will be placed in one of the troughs formed by the frames 15 16 on one side of the saws, the adjustable connection between the hand-levers 24 25 having been previously set to cut a board of the desired thickness. The weight of the quartered log being partly sustained by the movable frame 15, it will cause this frame to slide down the inclined bed-frame which supports it as soon as the latch 28 on the lever 25 is disengaged from the curved rack 29.

The weight of the log will be more than sufficient to overcome the friction of the moving parts, and hence no exertion will be required to set the machine for a new cut, which, so far as my information extends, is necessary in sawing-machines heretofore used. The next step will be to secure the overhead carriage to the quarter-log for the purpose of moving it against the saw. This is quickly done by moving the carriage over the quarter-log and sliding the blocks 38 39 inwardly until the arms 42 43 strike the ends of the logs. The cable or other driving means for the carriage may then be operated to draw the carriage to the opposite end of the machine, and with it the quarter-log, endwise against that one of the rapidly-moving saws which is parallel to the moving table on which the quarter is at that time resting. As the quarter-log is carried forward the wedge-shaped end 31 of the frame 16 enters the kerf made by the saw and deflects to one side the board which is being cut off and finally throws it off the machine onto the floor or a carrier by which it is removed from the mill. At the same time the main portion of the quarter-log after passing the wedge-shaped end 31 will pass onto the frames 15 and 16 on the other side of the operating saw.

It is to be remembered that the movement of the frame 15 on one side of the saw by the weight of the quarter-log resting thereon will cause the opposite frame 15 to be raised to the same plane occupied by the upper surface of the inactive saw whose inclination is the same as that of the frame 15. As soon as the quarter-log reaches the opposite end of the machine after a board has been removed therefrom the hand-lever 25 must be unlocked, thereby permitting the movable frame 15, on which the log rests, to drop a suitable distance for the cutting of a board from the opposite face of the log. If the operator for any reason—as, for instance, a defect in the log—desires to cut a board of increased or decreased thickness, it will be only necessary to change the angle between the levers 24 25, as before explained.

Among the advantages to be derived from the use of my invention may be mentioned the following: The entire log may be sawed into rift lumber, which, as hereinbefore stated, is the most valuable, being best adapted for flooring and ceiling, and especially for the manufacture of furniture, an important consideration in the production of such lumber being that it will not shrink or swell. In the working of lumber into furniture it is essential or advisable that the figure or grain of the wood, as in oak or other ornamental lumber, should appear, and this can only result from the use of rift or quarter-sawed lumber.

Rift lumber is superior to flat-sawed for barrel-staves and when sawed off into boards of the requisite thickness and afterward run through an edging-machine is well adapted for barrel-hoops and also for heads for barrels.

In the use of my invention there is also economy in the sawing of timber, inasmuch as thin saws may be used—such, for example, as will not make more than one-eighth of an inch saw-kerf. Furthermore, there is no waste in sawing a log, the bark edge being taken off each plank after it is sawed off the quarter-log and all its defects have been seen. Again, after a log has been quartered the sawing is done from the inside outwardly and at lines nearly directly from the center, whereby all defects are readily seen and worked out. The inner edge, or that farthest from the bark, is the best part of a log, and in the use of the machine constituting my invention this edge is always square and needs no edging.

As the faces of the quarter-log rest upon rollers which when dropped to place are a positive distance from the planes of the saws, and as the saws are positive and rigid in their proper planes, each board cut from the quarter-log will be of the same thickness and can thus be planed or dressed with minimum loss, a shaving of one-sixteenth of an inch being sufficient, thus causing a board one inch thick in the rough to finish up fifteen-sixteenths of an inch when dressed.

Having described my invention, I claim—

1. In a sawing-machine, the combination of fixed and movable work-supporting frames, two saws crossing each other at a right angle, and means for alternately operating the movable frames to and from the planes of the saws, substantially as set forth.

2. In a sawing-machine, the combination of two saws crossing each other at a right angle and adapted to cut in opposite directions, a fixed and a movable frame which together form a trough for carrying the material to be cut, and means for moving the material lengthwise in the trough against either saw, substantially as set forth.

3. In a sawing-machine, a saw, in combination with a work-supporting frame having a movable side, the said movable side being adapted to act as a gage and to be moved to a gaging position by the weight of the material thereon, substantially as set forth.

4. In a sawing-machine, saws crossed and facing in opposite directions, in combination with a work-supporting frame in front of each saw, one side of which is movable, each movable side being adapted to act as a gage and to be moved to a gaging position by the weight of the material thereon, and connections between the movable sides, substantially as set forth.

5. In a sawing-machine, the combination of saws, fixed and movable work-supporting frames, and means for alternately advancing one movable frame into the plane of one saw and withdrawing the other away from the plane of the other saw, substantially as set forth.

6. The combination with a saw, of a trough-like support for a quarter-log leading both to and from the saw, and so arranged that the board being cut may pass outside of the trough while the balance of the quarter-log remains in the trough, substantially as set forth.

7. The combination, with saws facing in opposite directions, of a trough-like support for a quarter-log in front of each saw, the said trough-like supports being in line longitudinally and so arranged that the board being cut passes outside of the trough while the balance of the log remains in the trough, substantially as set forth.

8. In a sawing-machine, the combination of a pair of crossed saws, a movable frame extending outwardly from the teeth of each saw, and a fixed frame in line with each movable frame and constituting a substantial continuation thereof, its end nearest the saw having a wedge-shaped extension, substantially as set forth.

9. In a sawing-machine, the combination of a pair of crossed saws, a trough-like support in front of each saw, one side of one support and the opposite side of the other support being movable, and movable connections between the two troughs, substantially as set forth.

10. In a sawing-machine, the combination of two saws adapted to cut at a right angle to each other, and a trough-shaped support facing each saw, one side of each trough-shaped support having a wedge-shaped extension close to and parallel to a saw, substantially as set forth.

11. In a sawing-machine, the combination of two saws running in planes at right angles to each other and cutting in opposite directions, and a trough-shaped support extending from the cutting edge of each saw, substantially as set forth.

12. In a sawing-machine, the combination of two saws running in planes at right angles to each other and provided with oppositely-faced teeth, and a trough-shaped support for the log extending outwardly from the cutting edge of each saw, the trough-shaped supports being in line endwise, substantially as set forth.

13. In a sawing-machine, the combination of two saws running in planes at right angles to each other their teeth being oppositely placed, and a trough-shaped support for the log, facing each saw each extending from the teeth of a saw outwardly in an opposite direction, and each having a fixed side and a movable side, substantially as set forth.

14. In a sawing-machine, the combination of two saws running in planes at right angles to each other, and a trough-shaped log-support extending outwardly from the cutting edge of each saw, the diagonally-opposite sides of each of which supports are movable and connected, substantially as set forth.

15. In a sawing-machine, the combination of two saws running in planes at right angles to each other, a trough-shaped log-support in front of each saw, each support having a movable side and a fixed side, the latter being provided with a wedge-shaped extension, substantially as set forth.

16. In a sawing-machine, the combination of two saws having cutting edges at right angles to each other, a trough-shaped support extending in opposite directions away from each of the saws, and an overhead carriage to engage the log and drive it from one support to the other past the saws, substantially as set forth.

17. In a sawing-machine, a quarter-log support consisting of a fixed side and a movable side at an angle to the fixed side, in combination with a saw running in a plane parallel to that of the movable side, the direction of movement of the said movable side being perpendicular to the plane of the saw, substantially as set forth.

18. In a sawing-machine, the combination of two saws running in a plane at right angles to each other and cutting in opposite directions, and a trough-shaped support for the material to be cut extending outwardly from the cutting edge of each saw, one side of each trough-shaped support being movable, substantially as set forth.

19. In a sawing-machine, the combination of two saws, crossed and facing in opposite directions, a fixed and a movable work-supporting frame in front of each saw, each fixed frame forming a continuation of the way or support afforded by the movable frame on the opposite side of the saws, substantially as set forth.

20. The combination with saws facing in opposite directions, of a work-support having a movable side in front of each saw, a rock-shaft beneath each support flexibly connected to the adjacent movable side and an adjustable connection between the rock-shafts, substantially as set forth.

21. The combination with saws facing in opposite directions, of a work-support having a movable side in front of each saw, a rock-shaft beneath each movable side and flexibly connected thereto, an adjustable connection between the rock-shafts, and means for locking the rock-shafts in a fixed position, substantially as set forth.

In testimony whereof I hereunto set my hand this 18th day of December, 1897.

MARK ASHLEY DEES.

Witnesses:
 HELEN E. PARKER,
 SIDNEY P. HOLLINGSWORTH.